(12) United States Patent
Ragucci et al.

(10) Patent No.: US 8,373,127 B2
(45) Date of Patent: Feb. 12, 2013

(54) METHOD OF SEARCHING FOR A THERMAL TARGET

(75) Inventors: Anthony J. Ragucci, Bryan, TX (US); John Lusher, Bryan, TX (US)

(73) Assignee: Lynntech, Inc., College Station, TX (US)

( * ) Notice: Subject to any disclaimer, the term of this patent is extended or adjusted under 35 U.S.C. 154(b) by 644 days.

(21) Appl. No.: 12/491,720

(22) Filed: Jun. 25, 2009

(65) Prior Publication Data

US 2009/0321636 A1  Dec. 31, 2009

Related U.S. Application Data

(60) Provisional application No. 61/076,142, filed on Jun. 26, 2008.

(51) Int. Cl.
*G01J 5/02* (2006.01)
(52) U.S. Cl. ......................... 250/346; 250/349
(58) Field of Classification Search ............... 250/338.1, 250/339.01, 349, 334
See application file for complete search history.

(56) References Cited

U.S. PATENT DOCUMENTS

| | | | |
|---|---|---|---|
| 5,005,083 A | 4/1991 | Grage et al. | |
| 5,077,609 A * | 12/1991 | Manelphe | 348/144 |
| 5,274,236 A | 12/1993 | Pascale et al. | |
| 5,371,358 A * | 12/1994 | Chang et al. | 250/226 |
| 5,371,542 A | 12/1994 | Pauli et al. | |
| 5,894,323 A * | 4/1999 | Kain et al. | 348/116 |
| 5,963,653 A | 10/1999 | McNary et al. | |
| 6,359,681 B1 | 3/2002 | Housand et al. | |
| 7,298,869 B1 | 11/2007 | Abernathy | |
| 7,395,156 B2 | 7/2008 | Chiou et al. | |
| 7,555,143 B2 | 6/2009 | Flath et al. | |
| 2003/0218674 A1 | 11/2003 | Zhao et al. | |
| 2005/0029458 A1 * | 2/2005 | Geng et al. | 250/347 |
| 2006/0049350 A1 | 3/2006 | Teich et al. | |
| 2007/0040062 A1 * | 2/2007 | Lau et al. | 244/3.16 |

FOREIGN PATENT DOCUMENTS

CA  2140681  1/1995

OTHER PUBLICATIONS

May, et al. "Registration No. H713—'Automatic Target Detection and Recognition'", US Statutory Invention Registration, Published Nov. 7, 1989, pp. 1-50.
PCT Notification "International Search Report and Written Opinion", Oct. 22, 2009, pp. 1-14.

* cited by examiner

*Primary Examiner* — David Porta
*Assistant Examiner* — Casey Bryant
(74) *Attorney, Agent, or Firm* — Jeffrey L. Streets; Streets & Steele (57) ABSTRACT

A system and method are used to search for a thermal target from a moving aerial platform. The system includes a computer corrected to a wide field-of-view thermal imager, a narrow field-of-view thermal imager, a global navigation satellite system receiver, and an inertial navigation system. The wide field-of-view thermal imager acouires multiple images as the wide field-of-view thermal imager moves relative to a search area. Each point of each imaoe is correlated to a stationary position within the search area. The computer is configured to independently time-average the thermal signal amplitude emanating from each stationary sector in the search area imaged bv the wide field-of-view thermal imager. and direct the narrow field-of-view thermal imager to point to the stationary position of the sector of interest and display a thermal imaoe associated with the sector of interest to a user.

19 Claims, 7 Drawing Sheets

METHOD OF SEARCHING FOR A THERMAL TARGET

CROSS REFERENCE TO RELATED APPLICATIONS

This application claims priority of U.S. provisional patent application 61/076,142 filed on Jun. 26, 2008.

STATEMENT REGARDING FEDERALLY SPONSORED RESEARCH OF DEVELOPMENT

This invention was developed with funding under Contract No. NBCHC080047 awarded by the U.S. Department of the Interior. The government may have rights in this invention.

BACKGROUND OF THE INVENTION

1. Field of the Invention

The present invention relates to searching for small thermal targets, such as a human swimmer in open water, and particularly in the context of a search and rescue, port security, or homeland defense operation.

2. Background of the Related Art

It is often necessary to locate small thermal targets, such as mammals, vehicles, periscopes, or watercraft, amidst a comparatively vast expanse of open land or water. Humans are the most common subject of such searches, such as during a search and rescue ("SAR") operation following an aircraft or watercraft accident in open water. Other open-water searches are sometimes performed for law enforcement patrols and counter-terrorism efforts, such as in the enforcement of "open-ocean homeland security." In these searches, it may be necessary to detect a small target, such as a periscope or other indicator of a submersed object. Land searches may include, for example, the search for humans or animals of interest in the wilderness. Even automobiles, watercraft, or aircraft may be the subject of a search. In the context of open water searches for humans, the most basic method of detecting a human target involves visually scanning an area of water, using the naked eye, such as from an aircraft. The effective maximum sweep width with this approach under optimal visibility conditions is 0.1 nautical miles (NM), or about 600 feet, according to the United States National Search and Rescue Supplement to the International Aeronautical Maritime Search and Rescue Manual, published in May of 2000 by the National Search and Rescue Committee ("NSARC"). Visual inspection is extremely difficult and factors such as fatigue can play a considerable role in the effectiveness of such a search. Therefore, a variety of systems and methods have been implemented to assist or supplant naked-eye searches.

Radar is one example of a system used extensively in open-water searches. However, human targets are generally too small to detect with radar. Both Forward-Looking Airborne Radar ("FLAR") and Side-Looking Airborne Radar ("SLAR") are better suited to detecting ships and other large-scale objects than humans. The smallest object deemed accessible by either method is a 4-person life raft, according to the NASARC.

Another search system and method involves Forward Looking Infrared ("FLIR"). FLIR is currently the most effective commercially-available means of swimmer detection. However, it is still greatly limited in its small-target search capability. At a wide field of view ("WFOV"), the spatial resolution on the screen viewed by the human user is too coarse to resolve small targets. When the imager is used with a narrow field of view ("NFOV"), only a small search area can be viewed at any one time. Since a human searcher requires time to recognize a search target in the field of view, the rate of progression for a search is quite slow. This is often referred to as the "soda straw" effect. The NSARC-recommended sweep width for a FLIR system when looking for a swimmer is 0.3 NM, assuming a Douglas Sea Scale ("DSS") of no more than 1. For reference, a DSS value of 1 corresponds to "smooth" seas with wave heights of no more than 1 foot. Above a DSS value of 1, the recommended sweep width drops to 0. In stronger seas, the waves can momentarily obscure the swimmer from direct view and, thereby, the detection opportunity may be missed by conventional methods. Since the field of view of the imager is rather narrow, the infrared ("IR") imager used in FLIR must typically raster back and forth to cover a wide area of interest.

SUMMARY OF THE INVENTION

One embodiment of the invention provides a system for searching for a thermal target, comprising a wide field-of-view ("WFOV") thermal imager disposed on an aerial platform and configured for directing toward a search area and geo-registering thermal signals across a field of view of the WFOV thermal imager, a narrow field-of-view ("NFOV") thermal imager configured to geo-point and zoom to a field of view that is 10% or less of the WFOV thermal imager's field of view, and a computer connected to both the WFOV and NFOV thermal imagers. The computer is configured to spatially register and time-integrate the amplitude of the thermal signal emanating from each of a plurality of sectors in the search area imaged by the WFOV imager, identify one or more sectors of interest having an average thermal signal that is at least three standard deviations above a local mean thermal signal, and direct the NFOV thermal-imaging video imager to geo-point to the sector of interest and display a thermal image associated with the sector of interest to a user.

Another embodiment of the invention provides a method for searching for a thermal target from an aerial platform, comprising identifying a search area and a plurality of sectors within the search area, tracking movement of the aerial platform over the search area, directing a wide field-of-view (WFOV) infrared imager toward the search area, tracking each of the plurality of sectors as images of the sectors pass across successive pixels in a focal plane array of the WFOV imager and averaging thermal signals associated with each sector at successive pixels over a period of time, identifying a sector having an average thermal signal which exceeds the average thermal signal of the surrounding sectors, and directing a NFOV infrared imager to image the identified sector at a higher resolution than imaged by the WFOV infrared imager to assess whether the identified sector contains the object of the search. The WFOV imager includes the focal plane array, wherein the focal plane array has a plurality of pixels, wherein the plurality of pixels includes one or more pixel responsive to heat emitted by each of the plurality of sectors that pass within a field of view of the WFOV imager as the sectors pass beneath the aerial platform.

A still further embodiment of the invention provides a method for searching for a thermal target, comprising: directing a WFOV thermal imager disposed on a moving platform toward a selected search area; geo-registering an image in a field of view of the WFOV thermal imager; spatially registering and averaging the amplitude of a thermal signal emanating from each sector in the search area imaged by the WFOV thermal imager; identifying one or more sectors of interest as any sector having an average signal that is at least three standard deviations above a local mean; directing a NFOV thermal-imaging video imager disposed on the moving platform configured to geo-point to the sector of interest, zoom to a field of view that is equal to or less than 10% of the field of view of the WFOV thermal-imaging imager; and displaying the sector of interest to a user.

BRIEF DESCRIPTION OF THE DRAWINGS

FIGS. 6A-D are schematic diagrams illustrating the WAIRI system in operation.

DETAILED DESCRIPTION OF THE INVENTION

The invention includes systems and methods of using infrared imaging technology to search for thermal targets within a search area with improved search efficiency and probability of detection relative to conventional systems and methods. One embodiment of the invention provides a system suitable for searching for humans in a body of water from overhead, such as from an aircraft. A Wide-Area InfraRed Imaging ("WAIRI") system consists of three main subsystems: (1) a small, turreted geo-pointing thermal imager with a wide field of view (WFOV), (2) a large turreted geo-pointing thermal imager with a narrow field of view (NFOV), and (3) an Embedded Global Positioning System (GPS)/Inertial Navigation System (INS) (the GPS/INS combination being referred to as "EGI"). The WFOV imager is directed downwards and covers wide sweep widths from the aircraft at a resolution sufficient to determine potential targets in a search area based on an algorithm described in further detail below. WAIRI may utilize geo-registered thermal signal integration from the WFOV imager in a process of determining the potential targets. The location(s) of the identified potential target(s) are then relayed to the NFOV imager, which has a higher spatial resolution compared with the WFOV imager. The NFOV imager may focus on select potential targets, based on temperature differential from the local average background of the ocean surface and target spatial extent information. The NFOV video stream is presented to either a human user or to automatic target recognition software which may determine if the scene imaged by the NFOV imager contains the object of the search effort. The result is a search method that produces a wide sweep width with a high probability of detection. The search benefits from a synergy between the WFOV and NFOV imagers, such that the overall probability of detection is higher, the resulting sweep width is wider, and the search efficiency is higher than could be provided by either imager, alone. The term "imager" is intended to broadly encompass cameras or other configurations of components that enable the capture of an image.

It should be emphasized that the WAIRI system and its use as described herein is not merely a "dual-staring array imager" meant to double the performance of an existing IR imaging platform. Although such an approach would indeed improve performance, the fundamental limitations of an instrument with a narrow field of view would still be present. In effect, the performance of a single FLIR imager could be substantially enhanced by using an array of FLIR imagers, instead. Each could image a narrow swath of sea as it passed by below the aircraft. However, dozens of imagers (if not more) would be required to cover a broad, continuous visualization range perpendicular to the flight path. Not only would the cost of such a system be prohibitively expensive but the imaging and computer hardware required to acquire, import, and analyze the image streams coming from each FLIR to implement a real-time target recognition algorithm would be excessively cumbersome. Similarly, a human user could not effectively process live video data being streamed from several imagers at one time.

Although the hardware of a WAIRI system may include a commercially-available streaming IR camera with a wide angle lens, the way in which the data is analyzed to locate potential targets is fundamentally different than the methods used in other systems. In the context of water searches, the focal plane array ("FPA") of the imager images a search area in open ocean, which slips under the aircraft continuously at the rate of the aircraft's groundspeed. Because of the altitude of the aircraft in relation to the wide area imaged, the presence of a human target with only a head exposed out of the water would be much smaller than the area imaged by a single pixel of the FPA in the WFOV imager. Therefore, the WFOV imager will not image the human target directly. Instead, the system will track sectors of open ocean, each sector approximately the size covered by one pixel of the WFOV imager, as they pass across the field of view of the WFOV imager. Each location in the search area is contained within a specific sector and the regularly-tiled array of sectors may be established a priori, based on absolute latitude and longitude coordinates. The WAIRI system averages the infrared intensity emanating from each sector of ocean imaged by the WFOV imager over a total period of several seconds. If a human target is present in a sector, the average temperature of that sector will be slightly higher than the surrounding sectors. For instance, if a person's head is 6° C. hotter than the ocean surface temperature in the sector he is floating in and the cross-sectional area of his head is 0.075 $m^2$, and the area of one sector is 9 $m^2$, then the average temperature of the sector he is in will be 0.05° C. hotter than it would be if he was not present. Hence, the system will indicate that the sector of ocean in question may potentially hold a target and that some period of time from the NFOV imager may be warranted to inspect that sector more carefully.

An imaging system according to an embodiment of the invention includes a WFOV imager and an NFOV imager residing on an aircraft. The imaging system continuously acquires navigation and orientation data from an on-board EGI. This positional data is used to effectively track the progress of the aircraft over the water so that the thermal pattern of the ocean surface can be geo-registered. In other words, the thermal data acquired can be continuously mapped to an on-board database according to the geophysical origins of the thermal data. Thermal data acquired from the same sector in multiple video frames can be ascribed to the same database register corresponding to that location in the search area. Therefore, there is a direct correspondence between the many small areas on the ocean surface ("sectors") and the electronic database of locations measured ("registers").

The search area may be processed as a rectangular grid of sectors. The WAIRI system includes a WFOV imager that may be directed toward the ocean to track the identified sectors. The WFOV imager includes an FPA, which may be an array of pixels responsive to infrared radiation emitted from the sectors that pass within the imager's field of view. The WFOV imager continuously monitors a wide swath of ocean at a low spatial resolution compared with the NFOV imager while tracking the sectors of ocean surface as they pass beneath the aircraft. Low resolution in this context will depend on flight altitude and imager parameters but, as an example, one pixel might cover an area of ocean 3 m×3 m. The FPA images the search area in open ocean in view of the FPA, with the imaged area passing under the aircraft continuously at the rate of the aircraft's groundspeed.

As the image of a sector of ocean passes down the FPA of the WFOV imager, the average infrared radiation intensity from that sector may be determined by averaging the intensity values registered by each pixel that imaged that sector as it passed across the imager field of view. During its time in the field of view, the sector will pass under multiple pixels of the WFOV imager, and a signal will be generated for that sector in each video frame. The aggregate signal from that sector passing through successive pixels over several video frames is compared with the aggregate signal from other sectors nearby. If the average temperature for a particular sector is anomalously high relative to the nearby sectors, that indicates that there may be a relevant heat source, such as a human, in that sector. The signal from a sector of interest might be 3 or more standard deviations higher than the local mean, for instance, and most preferably at least 4 standard deviations. Such identified sectors may then be selected for further inspection. This process runs concurrently for each sector imaged by the WFOV imager. So, for a WFOV imager with a resolution of 320×240 pixels, for instance, 76,800 sectors (320×240) might be processed at any one instant.

To investigate further, the WAIRI system may communicate the location of sectors with the highest probability of containing the object of the search effort to the NFOV imager. The sector with the greatest positive deviation from the local mean temperature and for which other nearby sectors do not indicate similar deviations would be the highest-probability sector in the field of view. In response to receiving the communicated locations, the NFOV imager may slew to image the associated sector at a much higher spatial resolution (sufficient to identify the target under search) than provided by the WFOV imager. A typical pixel on the NFOV imager might cover an area 5 cm×5 cm. A user, which may be a human or a computer operated according to a computer program, can then assess if the sector does contain the object of the search effort.

Several beneficial results may follow from this approach. First, since each sector of ocean is imaged over a long integration time and by multiple pixels, intermittent effects such as bobbing or periodic masking of a target due to high sea state are mitigated over a long-term average. Secondly, an especially wide swath of ocean can be continuously monitored, surmounting both the problem of imaging only a narrow field of view using a single turreted FLIR and eliminating the need to rapidly raster over an area looking for targets. Third, the majority of information "chaff" may be removed, which would otherwise be incumbent upon a FLIR imager user to view. WAIRI thereby prioritizes the time and capabilities of the NFOV imager and the system user to focus on regions of interest that are most likely to contain the object of the search effort.

In the context of open-water SAR operations, the proposed technology increases the likelihood of recovering a swimmer at sea before he or she incurs harm. As indicated in the following table, determined from the Cold Water Survival Model ("CWSM") developed by Canada's Defense and Civil Institute for Environmental Medicine, time is a significant factor in maritime SAR:

| Expected cold water survival time for a swimmer in open water. | | |
| --- | --- | --- |
| Water Temperature | Exhaustion or Unconsciousness | Expected Survival |
| 21-27° C. | 3-12 hrs | 3 hrs-indef. |
| 16-21° C. | 2-7 hrs | 2-40 hrs |
| 10-16° C. | 1-2 hrs | 1-6 hrs |
| 4-10° C. | 30-60 min | 1-3 hrs |
| 0-4° C. | 15-30 min | 30-90 min |
| <0° C. | <15 min | <15-45 min |

Additionally, the cost of conducting a search is ultimately reduced as well. According to the U.S. Coast Guard Addendum to the United States National SAR Supplement, the U.S. Coast Guard conducts more than 5,000 searches annually on average at a cost of roughly $50 million. A fifth of those searches continue more than 12 hours and longer searches are generally much more expensive than short searches; each hour that a Coast Guard aircraft is airborne costs approximately $3,700 and several aircraft may be used in a widespread SAR mission. Therefore, the potential cost savings from reduced search time is significant.

Figure 1A:
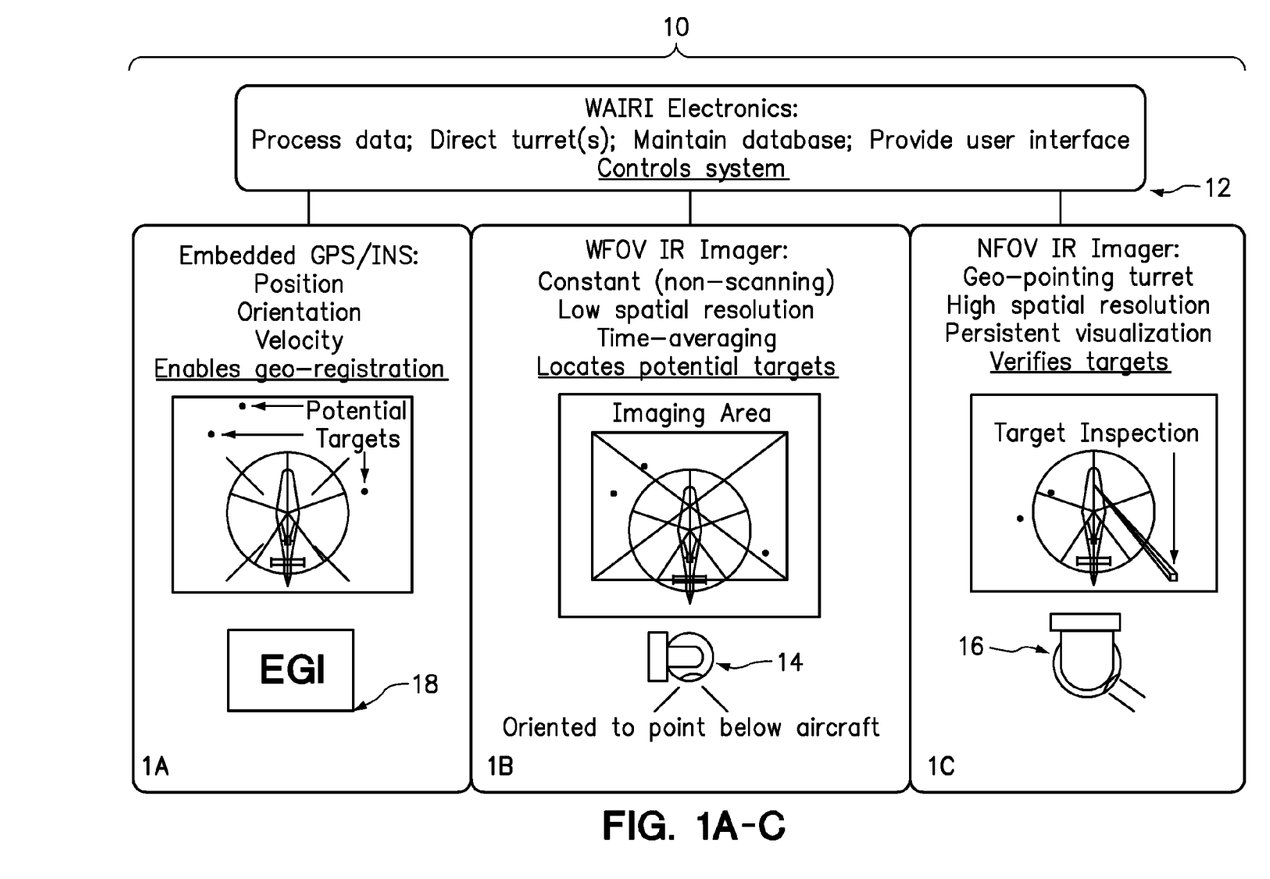
FIG. 1 is a schematic diagram of components of a Wide-Area InfraRed Imaging System ("WAIRI") according to an embodiment of the invention, including a wide field-of-view (WFOV) IR imager and a narrow field of view (NFOV) IR imager.

FIG. 1 is a schematic diagram of components of a WAIRI system 10 according to an embodiment of the invention and indicates the role of each component. The WAIRI system electronics 12 constantly acquires navigation and orientation data 1A using the Embedded Global Positioning System (GPS)/Inertial Navigation System (INS) on-board the aircraft, known as an "EGI" 18. This information, in combination with known geometric data about the FOV of the WFOV imager 14, is used to determine the GPS position of thermal targets on the ocean surface within the field of view of the WFOV imager 14. The WAIRI system 10 continuously monitors a wide swath of ocean using the WFOV imager 14 and geo-registers thermal data from the ocean surface. As the image of each sector of ocean passes down the FPA, the thermal signal from that sector is continuously recorded and added to a memory stack temporarily reserved for that sector. By signal averaging, even targets that are below the thermal and spatial resolution of the WFOV imager can be detected. A parallel algorithm then scans the geo-registered integration stack to look for sectors that have a high probability of containing a human target (i.e., the object of the search effort). To investigate further, the WAIRI system communicates the locations of the high-probability sectors to a NFOV imager 16 which, in turn, swivels to image those specific sectors of interest at a much higher magnification 1C. The video stream from the NFOV imager 16 is presented or displayed to the human user who may determine if that FOV contains the object of the search effort. If the FOV does not contain the object of the search effort, no input from the user is required; the system will automatically log the sector as not containing the target and display another sector of interest in about 7 seconds. If the sector of interest contains the target, then the target can be tracked on-screen and the flight path can be adjusted to intercept.

Figure 2:
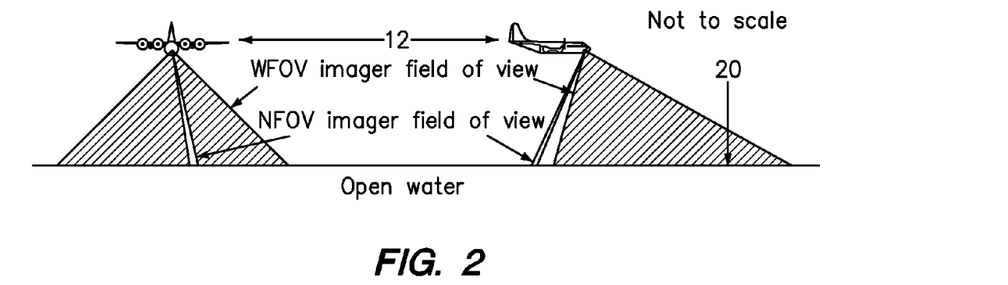
FIG. 2 is a schematic diagram illustrating the use of the imaging system on an aerial platform provided by an aircraft.

FIG. 2 is a schematic diagram illustrating the use of the imaging system 10 on an aerial platform provided by an aircraft 12. The operation of the imaging system 10 may be described in terms of locating a human target in the water, and the target may be referred to as the "swimmer." The process for swimmer detection begins by acquiring a video signal from the WFOV imager 14, which is trained down towards the water as shown in region 20. The video signal is acquired by the WFOV imager 14 at a high frame rate, such as 60 Hz, and raw data is obtained from the imager's FPA, rather than calibrated temperature data. The raw data is in the form of integer counts detected at each pixel of the FPA, which can be processed by a computer at a much faster rate than floating-point numbers can be.

The high WFOV imager frame rate is useful for a number of reasons. First, the high imager frame rate helps ensure that the frames are acquired at a rate fast enough that rapid changes in the imager's field of view do not cause blurring of the image. Second, and most importantly, the increase in the signal-to-noise ratio of the target relative to the background is proportional to the square root of the number of frames averaged in which the target appears. So consider, for example, a 320×240 FPA oriented such that the 240-pixel direction of the FPA is parallel to the direction of aircraft forward progress. If it takes 20 seconds for the target to move down the field of view and images are captured at a rate of 60 Hz, then the target will be imaged a total of (20 seconds)×(60 Hz)=1,200 times. Since the increase in signal-to-noise (SNR) ratio for an averaged signal containing random noise is proportional to the square root of the number of samples taken, then the increase in SNR of the target will be √1,200=35. This increase enables the detection of targets that are below the raw sensitivity or spatial resolution of the imager.

At the same instant each video frame is acquired, the concurrent positional state of the aircraft is also acquired including GPS location, altitude, and the 3-axis rotational orientation relative to the Earth. This spatial position and orientation data can be obtained through the EGI 18 (see FIG. 1) of the aircraft, through a system internal to the imager system, or through a combination of the two. The orientation of the imager can then be adjusted in real time to counteract the effect of either transient motion of the aircraft as it is buffeted in the air or intentional deviations from a straight and level flight path.

A vector of at least six (6) components, representing the physical position and orientation of the aircraft at one instant in time, is associated with each frame captured from the imager. For any single frame, based on the information contained in the associated vector, each point of physical space in the field of view in the image frame can be correlated to an absolute position in latitude and longitude coordinates. For the purpose of this document, the process of performing this mapping will be called "geo-registration." This process can be completed rapidly due to the topology of the surface being imaged. That is, because the water surface is approximately a flat plane over the field of view, the translation from image and vector to geo-registration of the field of view can be accomplished in real time. The minimum vector to represent the complete position and orientation of the imager in physical space will be referred to as X, as indicated below, although further information could be contained in this vector based on inertial measurements, time-differential measurements, or other enhancements to improve upon the accuracy and precision of the location and orientation information.

$$X = \begin{bmatrix} x \\ y \\ z \\ \phi \\ \theta \\ \psi \end{bmatrix}$$

A target equivalent to a swimmer in the water as viewed from the WFOV imager 14 on the aerial platform provided by the aircraft 12 may be included in the field of view of the WFOV imager 14, even though the WFOV imager 14 may not be able to resolve the target. A "target size" may be defined as the product of the target-background temperature differential and the target's area either in physical space (absolute target size) or in the image (image target size). So, for instance, a person's head may have a temperature that is 6° C. (6 K) higher than the surrounding ocean and a cross-sectional area as seen from above of 0.075 m². Therefore, the absolute target size is 0.075 m²×6 K=0.45 m²K. Similarly, that same target as viewed by an imager with a 90° field of view at an altitude of 3,300 feet might only occupy 0.8% of the area of one pixel. The image target size would then be 0.008 pixels×6 K=0.048 pixel·K. A target of such size is within the typical operational range of the system, even though the instantaneous amplitude of the thermal signal relative to the local mean may be at or near the noise-equivalent temperature differential ("NETD") of the WFOV imager 14.

One enhancement to the system which can be performed is that the average background of the field of view can be subtracted from each raw frame captured from the imager. This step reduces the effect of the fixed pattern noise ("FPN") of the imager, which distorts the magnitude of the thermal radiation impinging on each pixel of the FPA due to inherent non-uniformity in the sensitivity of the pixels that make up the FPA. Also, this can reduce the magnitude of fixed signal in the field of view, such as might be present from the constant reflection of the Sun off of the water surface. The background data can be obtained by averaging many orientation-registered images of a blank field of view. Once the background image has been collected, it can be subtracted from each frame image collected from the imager subsequent to that time as long as the environmental conditions for imaging remain relatively constant. If the environmental conditions fluctuate in time or deviate from the conditions under which the background data was collected to a large extent, then the background subtraction step should be skipped in the process in order to avoid adding unwanted signal to each frame due to inaccurate background subtraction.

Figure 3:
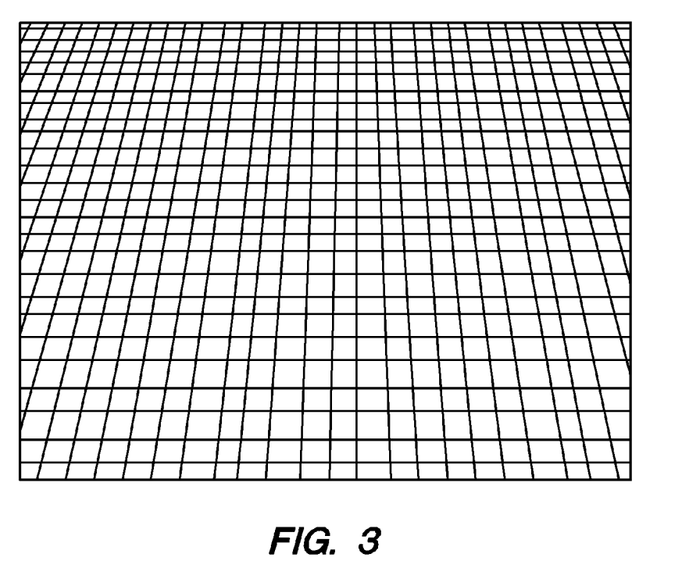
FIG. 3 is a perspective field of view from the WFOV imager in which a square grid of hot wires has been laid out in the plane of the water surface.

After a single raw image has been acquired and, optionally, background-subtracted, the next step in the process is to correct for perspective and visual distortion of the water area imaged in the field of view. FIG. 3 is an oblique field of view from the WFOV imager 14 in which a square grid of hot wires has been laid out in the plane of the water surface. The near-vertical lines in the image appear to converge to a virtual point above the top of the field of view. This is due to image perspective; sectors of water which are farther away appear smaller than sectors which are closer. This can be corrected through a straightforward geometric transformation of the image data.

Figure 4:
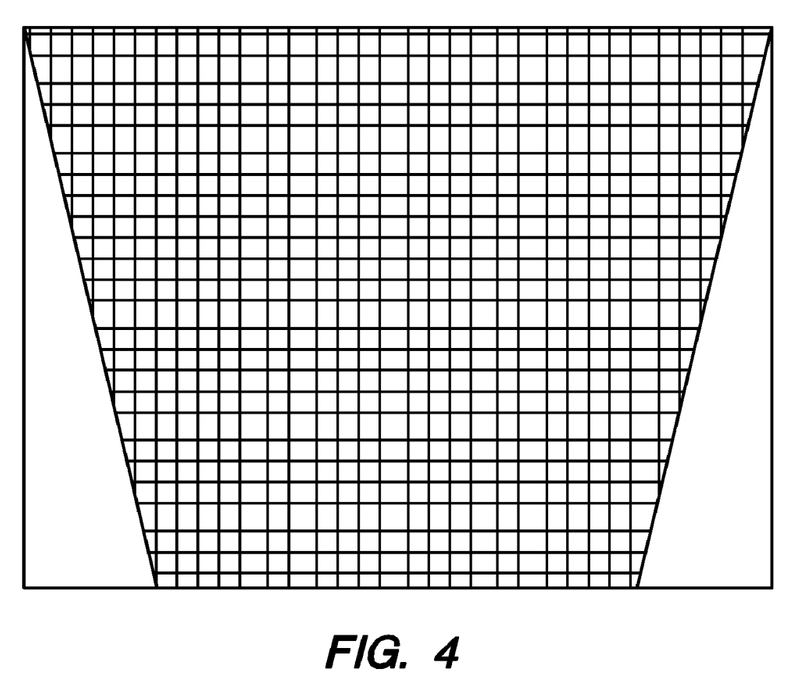
FIG. 4 is a perspective field of view from the WFOV imager after the resulting transformation removes the image perspective.

FIG. 4 is the same field of view from the WFOV imager 14 shown in FIG. 3 after the transformation removes the image perspective. This transformation aids in the proper alignment of each frame from the WFOV imager 14 for geo-referencing and subsequent image averaging. Note that a far-off-center target, if following a straight vertical path in the corrected-perspective image, will have its path truncated by the side of the imager FOV. This effect creates the tail in the system's lateral detection profile.

Other corrections to the image can also be applied to account for optical aberrations such as barrel distortion, which causes the apparent curvature of straight lines near the edge of the FOV and is commonly found in images covering a wide FOV. This would only be necessary if such distortions interfered with subsequent geo-registration and averaging of sequential images. These other corrections may be applied before, during, or after the perspective correction step.

These image perspective and distortion-correction steps can be performed through live calculation of a multiplicative image correction matrix or using a lookup table of pre-calculated matrices for a range of possible imager orientation vectors. Using a lookup table would reduce the processing requirements significantly and would likely result in a reduced process-cycle-time and hence, increased effective frame rate for a given processing capability.

The corrected image data can then be geo-registered or mapped to latitudinal and longitudinal coordinates using the position and orientation vector recorded at the instant the image was captured. The center of the field of view of any image is directly in-line with the centerline of the imager and, hence, its latitude and longitude information can be determined through straightforward geometry that can be accomplished using the X vector recorded simultaneously with the image. Similarly, the rotation and scale of the image can be determined from that same vector. Therefore, the coordinates of any point on the imaged water surface can be directly determined. This geo-registered image is then stored temporarily in a RAM stack, where it can be quickly pulled for later analysis.

Having defined the steps of perspective correction, distortion correction, and geo-registration separately, it is also possible to perform all of these steps simultaneously and computationally efficiently through appropriate system configuration, as long as the surface-level height variations are small compared to the aircraft altitude. This would normally be the case, for instance, on the ocean surface. Using calibration data from the WFOV imager optics, a perspective and distortion map for the WFOV imager can be generated. Live data from the EGI can be used to point the WFOV imager directly below the aircraft at all times. Perspective in the field of view will then be constant to within a scaling factor given by the flight altitude. Distortion due to the lenses, themselves, will also be constant. Therefore, the absolute position of any point in the WAIRI system's WFOV can be determined straightforwardly by knowing only the perspective/distortion matrix for the optics, flight altitude, and the absolute heading of the WFOV imager, which may include both aircraft yaw and heading information.

Mathematically, consider the perspective/distortion matrix as the X and Y deviation in image space for each pixel on the FPA relative to the location in view at the dead center of the FPA. There will be a deviation in both the relative X and Y directions for each pixel, (i,j), called $X_{i,j}$ and $Y_{i,j}$ respectively, when the imager is a unit distance above a horizontal plane and staring with the optical axis normal to that plane. Since the imager is pointing straight down, the latitude and longitude imaged at the center of the array match the latitude and longitude of the imager, itself. Knowing the imager altitude, A, absolute azimuth, θ, GPS location, $(X_G, Y_G)$, and considering that the ocean surface can be considered planar on the flight-altitude distance scale, the GPS location of any point imaged in the field of view can be computed directly from the equation $$X_{i,j}^A = X_G + A(X_{i,j} \cos\theta + Y_{i,j} \sin\theta)$$

$$Y_{i,j}^A = Y_G + A(-X_{i,j} \sin\theta + Y_{i,j} \cos\theta).$$

Georegistration of the entire field of view can be accomplished using nothing more than simple scalar multiplication and matrix addition, which could be straightforwardly accomplished in real time with modest computational hardware. Geo-registered averaging of the FOV can be performed at the frame rate of the imager, enabling real-time operation under flight conditions. For this reason, the accuracy of the perspective/distortion matrix must be high to ensure geo-registration fidelity.

Figure 5:
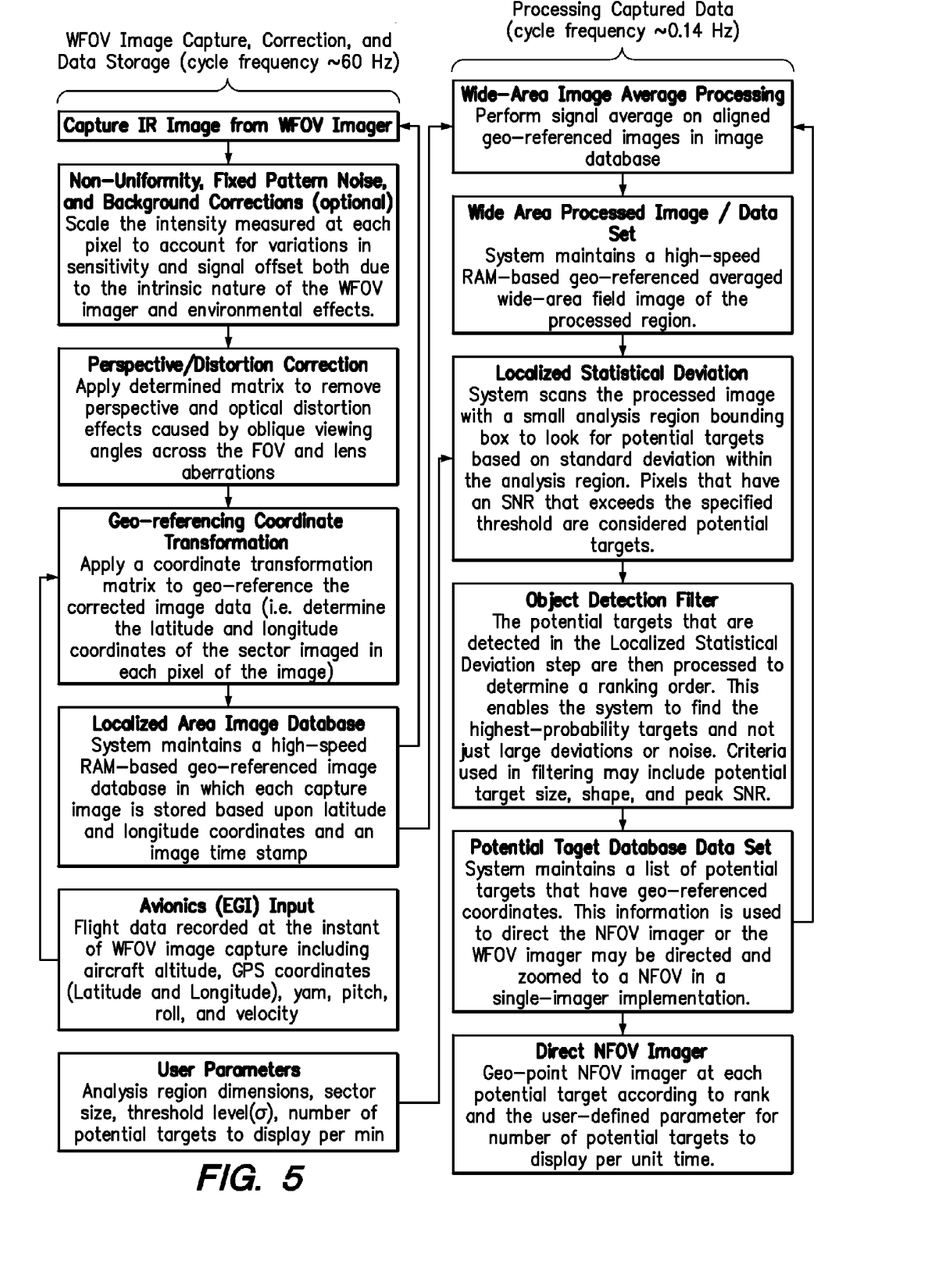
FIG. 5 is a processing flow chart for the complete flight-version WAIRI system.

The diagram in FIG. 5 summarizes the WAIRI process, which continually operates in two parallel loops. The first loop starts with the simultaneous acquisition of the infrared image and the position and orientation information from avionics and continues through the temporary storage of the geo-registered image frame in a RAM stack, as indicated on the left side of the diagram. This first loop of the algorithm iterates continuously at the frame rate of the imager (e.g. 60 Hz). The second half of the algorithm is a separate loop for averaging the geo-referenced images into a continuously updating map of swept area and analyzing that map to select targets of interest for the NFOV imager to view at high magnification. This second loop also operates continuously, in parallel with the first loop, as described on the right side of the diagram, and iterates at a rate defined by the number of potential targets the user wishes to see per unit time (e.g. once every 7 seconds or 0.14 Hz). Note that, as described previously, some of the discrete steps outlined in the overall diagram can be combined, such as the perspective/distortion correction and geo-referenced coordinate transformation steps.

To perform the signal averaging that enhances the SNR of targets in the imaged water, the thermal data from each sector of ocean must be averaged over several frame captures to build an averaged thermal map of the search area. The algorithm must then identify which anomalies have the greatest probability of being the object of the search effort, based on user-defined criteria. Last, the NFOV imager must automatically slew to the geo-location(s) identified by the WAIRI electronics and display the image of that target to the human user or to automatic target recognition software. This process is described in relation to FIGS. 6A-D.

Figure 6A:
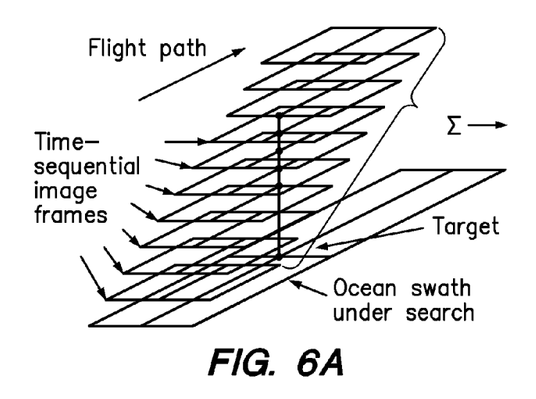
FIG. 6A shows that all digital frames from the WFOV imager are geo-registered and integrated together to build an averaged, thermal map of the search area as shown in FIG. 6B.
Figure 6B:
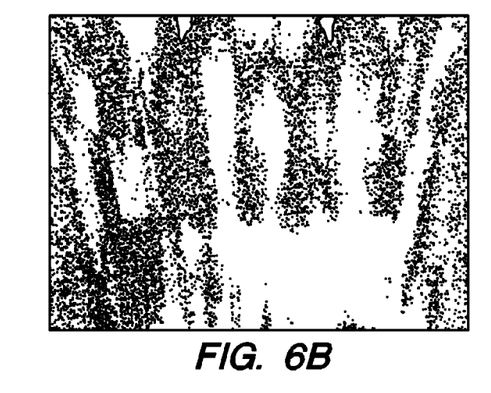
Figure 6C:
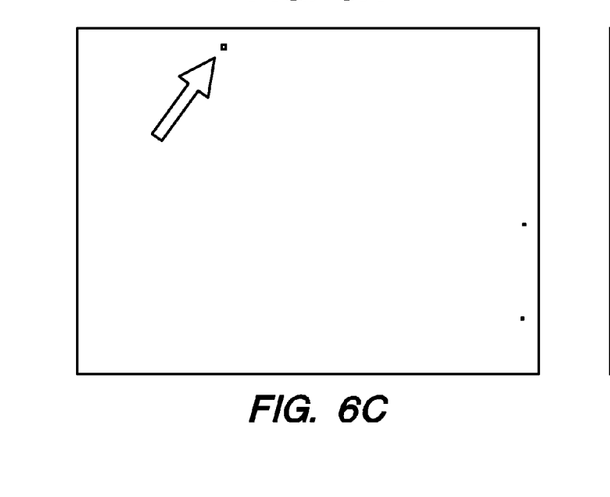
In FIG. 6C, the algorithm continuously identifies thermal anomalies that have a high probability of being the object of the search effort, based on user-defined criteria.
Figure 6D:
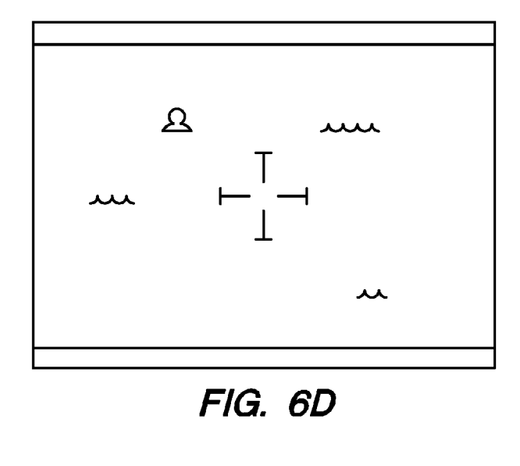
FIG. 6D is an image captured by the NFOV imager that interrogates those targets identified in FIG. 6C and presents the video stream to the human user, who verifies or rejects the target.

In FIG. 6A, the strip at the bottom of the image represents the swath of ocean being searched over a short period of time. The translucent plates stacked up in a stair-like fashion over the ocean strip represent a series of sequential WFOV imager video frames which are processed into the localized area image database as described previously. The wide area image averaging step integrates the signal from these images together in a geo-registered way, to form the map shown in FIG. 6B. The resulting wide area processed data set is a map of all the area covered during the search with each sector of ocean signal averaged over many frames. The resulting data set is a coverage map for the searched area, combined with the latitude and longitude of amplified target signals and the time at which those targets were acquired. This data set can be presented to the user as a running log of which areas of open water have been searched, what the coverage of the searched areas were, and when the areas were searched. An example of a wide area processed image map resulting from the integration of geo-registered images is shown in FIG. 6C. Finally, the live video from the NFOV imager trained on a specific anomaly, as it might be presented to a human user, for instance, is shown in FIG. 6D.

Referring again to FIG. 5, the second stage of the process determines which thermal anomalies in the processed image map should be investigated further by the NFOV imager. Because the NFOV imager can only image one potential target at a time, and there is time lost in sluing from one potential target to another, and a minimum amount of time is required for the user to actually determine if the region being imaged contains the object of the search effort, the criteria for potential target selection must be chosen judiciously.

A defined process is used to determine which thermal anomalies are of greatest interest. The system uses an analysis region bounding box, defined by the user, to analyze the averaged, geo-registered database map in small, discrete areas. The analysis region bounding box is typically a geometric shape such as a circle or a square that is a few pixels across. The analysis in each of these areas is referred to as a local analysis. The system effectively scans the analysis region bounding box over the recently processed database map and identifies any areas in which there is a thermal anomaly that meets the defined target criteria. Such anomalies are identified as potential targets.

Several criteria can be used in the evaluation of thermal anomalies. The first of these is a localized minimum value (threshold) of thermal anomaly signal amplitude (in standard deviations) necessary for the thermal anomaly to qualify as a potential target. Since the object of the search effort should be warmer than the surrounding water, all negative thermal deviations relative to the local mean can be rejected. Other criteria are then used to rank the potential targets in order of probability that they are the object of the search effort. The size, shape, average signal, and peak SNR of the potential target can all be used to rank the set of potential targets.

The selection of how many ranked potential targets to display to the user is determined by the number of potential targets to display per unit time, a parameter defined by the system user. This parameter determines how long the system user will have to view each potential target under inspection. The system selects the highest-ranked potential targets within range during the time frame made available by the forward progress of the aircraft. Setting this value to too high a number will cover many potential targets but the time duration that each target will remain on the screen will be too short for the user to accurately identify the thermal anomaly. Setting the value too low will skip many potential targets and the object of the search effort may be skipped as well. Allowing 7 seconds per potential target is recommended.

So, for instance, the following might be used in a search for a person in the ocean. The user might define a 40 pixel×40 pixel analysis region bounding box for the system to use for analysis of the averaged, geo-registered database map. After the local analysis was complete (that is, the analysis within the analysis region bounding box at that specific location), the analysis region bounding box would shift by 5 pixels and a new, local analysis would begin. The size of the bounding box shift could be defined by the user or a minimum value may be imposed by the system based on computing resources available and the scanning speed necessary to continue analysis in real time. This process might cycle at a rate of 100 Hz in order to keep up with the user-defined parameter for number of potential targets to display per unit time. Any thermal anomaly within the analysis region bounding box that was cooler than the average temperature within the analysis region could be rejected, since a person would be warmer than the surrounding ocean. Next, any thermal anomaly with a signal amplitude less than a given setpoint amplitude, such as 5 standard deviations from the mean thermal value within the local analysis region, could be rejected as noise. Also, any thermal anomaly greater than 5 pixels in extent could be rejected, since that thermal anomaly would be too large to be a person. If a thermal anomaly passed all of these evaluation criteria, then it would be identified by the system as a potential target.

Among the potential targets, one will have the greatest deviation from its background mean and that will become the "rank 1" target, or the one most likely to be the object of the search effort among the potential targets within range of the NFOV imager. The potential target with the second greatest deviation from the mean becomes the "rank 2" target and so on. Since a localized statistical deviation criteria is used, broad areas of high signal intensity, such as direct reflection of the Sun off the water would generate, are not identified as potential targets. Similarly, small-scale transient deviations such as Sun glint from waves average to a mean-field value over the course of the many image averages. Thereby, such clutter is drastically reduced, as well.

Based on this process, the most probable targets will be identified by the system, as indicated by the bounding box around the target pixel in FIG. 6C. This image covers the same field of view as the image in FIG. 6B, after the filtering has been applied. The target identified in this image is, indeed, the object of the search effort hidden in the field of view. Sectors containing such targets are determined from the averaged, geo-registered database map and the sector locations are added to a database of potential targets. Based on ranking and the number of targets to display per unit time, the location of some potential targets are then sent to the NFOV thermal imager which cues the targets and geo-points to each one, displaying its image at high magnification to the user. To further enhance the detection capability, the NFOV imager may determine the most intense target in the narrow field of view, zoom further to image that target at even higher magnification, and track that thermal target for the duration of time it is scheduled to image that target.

The system user would see only the overall map of the search area covered, with the most probable targets identified on it, and the live, zoomed image which moves from potential target to potential target as the aircraft progresses through its search. The entire algorithm describing this approach is summarized in the process diagram shown in FIG. 5.

Figure 7:
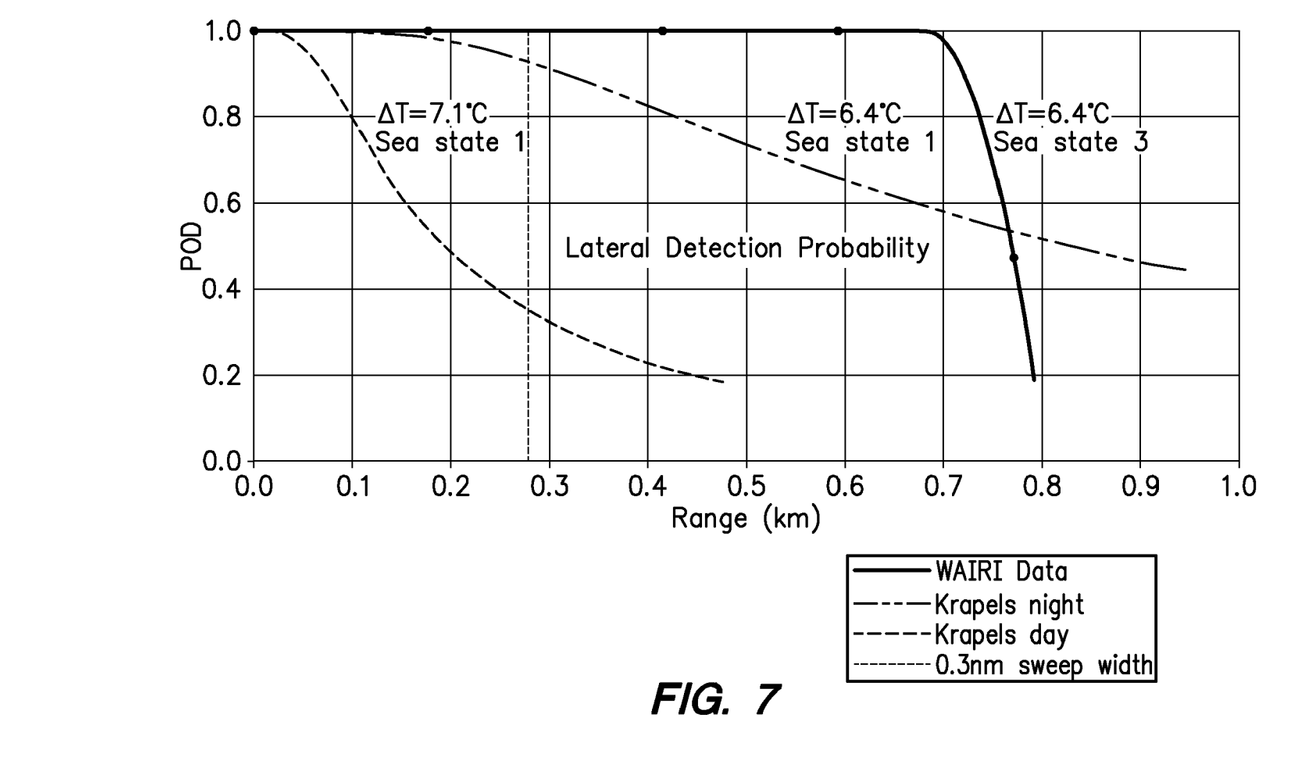
FIG. 7 is a graph comparing the lateral detection probability of finding a swimmer in open water using the WAIRI system described herein compared to using an unmodified FLIR imager.

The result of this search process is that the probability of detecting a swimmer in open water is significantly enhanced. FIG. 7 compares the lateral detection probability of finding a swimmer in open water using the WAIRI system described herein compared to using an unmodified FLIR imager as measured in K. Krapels, R. G. Driggers, J. F. Garcia, "Performance of infrared systems in swimmer detection for maritime security," *Optics Express*, Vol. 15, No. 19, pg. 12296, Sep. 17, 2007. The imager used in the Krapels data was almost 5 times more sensitive than the imager used in the WAIRI test set and the sea state condition in the Krapels data was only 1, whereas it was 3 in the WAIRI data. Also, the shape of the WAIRI lateral detection profile is much closer to a definite range profile than the other profiles, which follow an inverse cube model. The WAIRI lateral detection profile enables much more efficient searching, using the available search effort to the greatest advantage. Open-water search using the system described here clearly has a much greater probability of swimmer detection than search using an unaided FLIR imager.

The lateral detection profiles measured by Krapels et. al. under day conditions (7.1° C. $\Delta T$) and night conditions (6.4° C. $\Delta T$) and the measured profile for the WAIRI system (scaled 6.4° C. $\Delta T$) are shown. The recommended sweep width using standard FLIR to search for a person in the water (PIW) is 0.3 NM, or approximately 560 m, and is indicated by the dotted line. By integrating the area under each lateral detection profile, the total probability of finding a target within a specified distance from the imager can be determined, assuming that the target is present within that range. The total probability of detecting a PIW within a range of 0.7 km (normalized integrated area) for Krapels' day detection profile is 39%; for Krapels' night data it is 85%; for the WAIRI system it is >99%, based on 500 scaled measurements taken.

EXAMPLE 1

Figure 8:
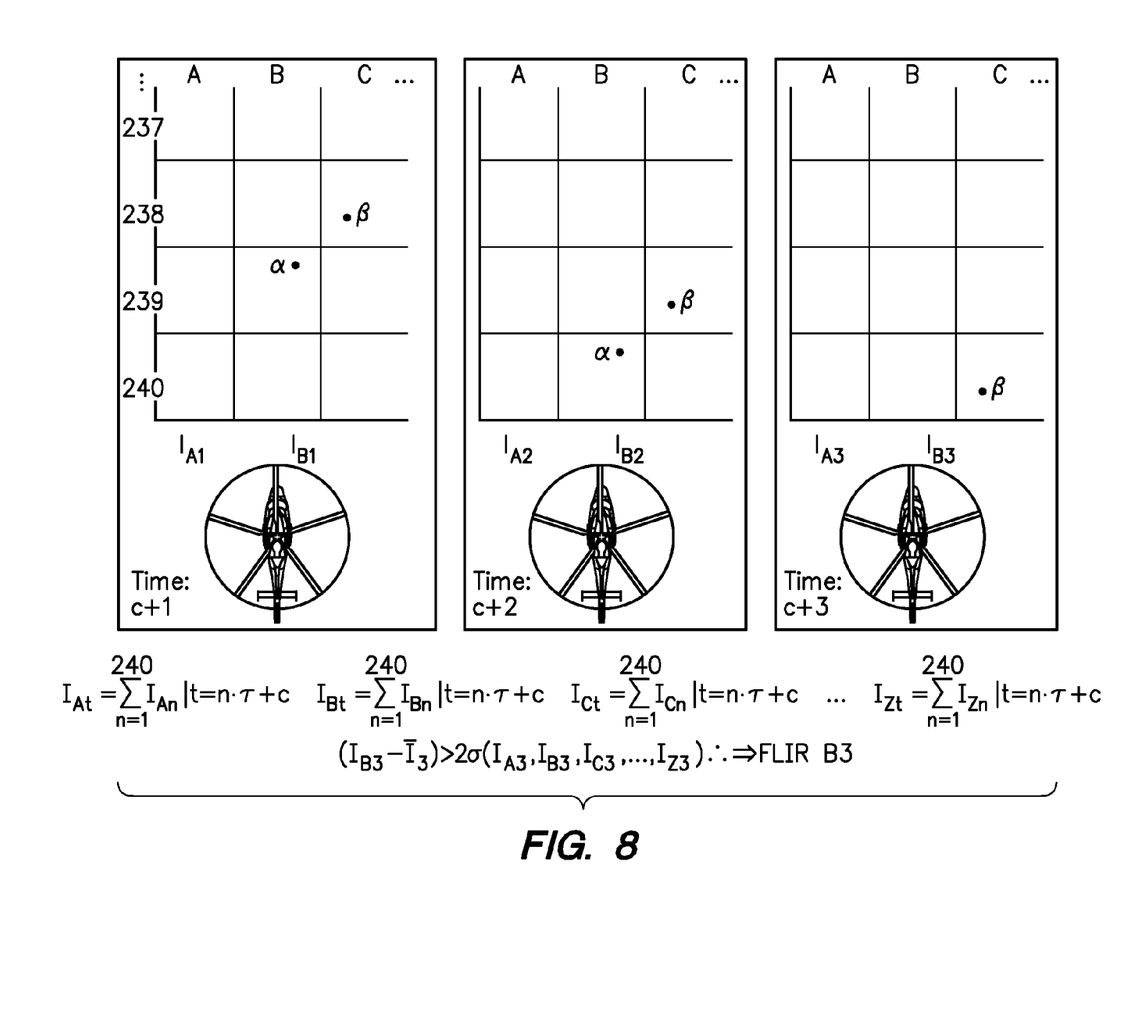
FIG. 8 is a simplified conceptual illustration of an example of the execution of an algorithm according an embodiment used to implement geo-registered integration on the imager focal plane array.

FIG. 8 is a schematic illustration of an example of the execution of an algorithm according an embodiment used to implement geo-registered integration with the imager FPA. In reality, target signals do not travel directly down columns of the FPA and integration maps are analyzed with real-time image processors, not just compared on a line-by-line basis. Therefore, this illustration is not meant to be interpreted too strictly.

Although only twelve sectors are shown here for illustrative purposes, thousands of sectors could be evaluated using an actual WAIRI system. Two targets, labeled $\alpha$ and $\beta$, are in water and approaching a SAR helicopter 30. As they pass under the view of the WAIRI system onboard the helicopter 30, the sectors of ocean in which each is located are continuously measured, as are all the other sectors within the field of view of the WFOV imager. Once the sector containing target $\alpha$ passes completely across the field of view, the accumulated signal associated with that ocean sector is averaged and compared to the average signal from each of the other columns in that row. Note that the signal from target $\beta$ does not play a role in this average, since it is on a different column. Since the thermal average of the sector containing target $\alpha$ is higher than the overall average at a statistically significant level, the WAIRI system then sends a command to the NFOV imager to inspect the coordinates associated with the sector containing target $\alpha$. Note that this simple example algorithm is but one of many that could be used both for integrating the target signal for a given sector and for comparing it to the average signal in the environment. Many numerical approaches for both signal integration and environmental comparisons are possible.

EXAMPLE 2

An experimental setup can mimic this algorithm in effect, even though relying on manually input values for speed and location, as opposed to GPS input. By statically mounting a WFOV imager over a pool of water and dragging a thermal target through the water at a known velocity, the experiment can mimic the effect of flying over a static target. A scale factor must be applied to all elements under test but in all other respects, the algorithm would be the same. The equivalent flight speed and altitude for the imager would be much higher than would typically be used on an SAR mission using FLIR, alone. Although the integration time for any one pixel would be insufficient to conclusively register the presence of a potential target, the time-averaged input from all the pixels imaging a target would significantly increase the statistical power of the measurement. Practical issues such as where the cutoff should be established in terms of the standard deviation of a measurement from the mean can either be established initially, or the most likely targets can be hierarchically selected from the pool of potential targets. However, the capability to adjust the threshold for the potential target indication can be included in the software implementation of the algorithm.

One skilled in the art having benefit of this disclosure may appreciate that the invention may also be used in applications other than searches over water from an aircraft. For example, in another embodiment, the imaging system 10 could instead be provided on a satellite and used to locate thermal objects on land or in water. The satellite provides an aerial platform as well, albeit at an altitude significantly higher than that of a typical aircraft. WFOV and NFOV imagers could be directed toward a search area on the Earth, such as an area of water or land. Due to the altitude of a satellite in orbit, the satellite could even focus on a search area within a selected air space, in which to search for aircraft in flight. As the satellite orbits around the Earth, specific sectors in the search area could be identified as containing "potential targets," as before. Then, the NFOV imager may be directed to image the associated sector at a much higher resolution than provided by the WFOV imager to confirm the selected target.

Similarly, other targets could be pursued, such as periscopes to detect submersible vehicles. Also, the orientation of the configuration could be reversed, such that the WAIRI system searches the sky from the ground to look for aircraft, or one aircraft could search for another, in which both searcher and target are airborne. Other targets for aerial-based searches over land might include mine detection, using thermal scarring artifacts, or thermal residue from recently-departed vehicles.

Furthermore, the methodology described herein need not be limited to search in the infrared region of the electromagnetic radiation spectrum. The system as described could be applied to search for any target having differential radiation characteristics in comparison to its surrounding environment. Other imaging platforms, such as a phased array in the radio-wavelength spectral range or a turreted system operating in the optical wavelength spectral range, could be enhanced using the method described.

As will also be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including high-level scripting languages such as MATLAB or Simulink, an object oriented programming language such as Java, Smalltalk, C++ or the like and conventional procedural programming languages, such as the "C" programming language or similar programming languages. The program code may execute entirely on a card within a subcomponent's computer system, the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention has been described with reference to flowchart illustrations and/or block diagrams of methods, apparatus (systems) and computer program products according to embodiments of the invention. It is understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. It should also be recognized that a computer program code is not limited to the blocks in the flowchart, and may also include additional steps or sub-steps described elsewhere in this document.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system for searching for a thermal target, comprising:
a wide field-of-view thermal imager for which the central direction along which each pixel images relative to the imager body is known, disposed on an aerial platform and configured for directing toward a search area; and
a global navigation satellite system receiver and an inertial navigation system on the aerial platform coupled to the wide field-of-view thermal imager such that the stationary ground positions imaged by each detector element of the wide field-of-view imager can be identified in each image frame and the thermal signals acquired from each detector element can be ascribed to their originating stationary ground positions as the wide field-of-view thermal imager moves relative to the search area; and
a narrow field-of-view thermal-imaging video imager configured to gee-point and zoom to a field of view that is less than or equal to 10% of the wide field-of-view; and
a computer connected to the wide field-of-view thermal imager, the narrow field-of-view thermal imager, the global navigation satellite system receiver, and the inertial navigation system, wherein the computer is configured to independently time-average the thermal signal amplitude emanating from each stationary sector in the search area imaged by the wide field-of-view thermal imager, identify a sector of interest having an average thermal signal that is at least three standard deviations above a local mean thermal signal, and direct the narrow field-of-view thermal imager to point to the stationary position of the sector of interest and display a thermal image associated with the sector of interest to a user.

2. The system of claim 1, wherein the wide field-of-view thermal imager is rigidly mounted to the aerial platform.

3. The system of claim 1, wherein the wide field-of-view thermal imager is movably mounted on a gimbal for counteracting the aerial platform's buffeting motion to hold the WFOV imager at a substantially constant orientation relative to the Earth.

4. The system of claim 1, wherein the wide field-of-view thermal imager and the narrow field-of-view thermal imager are both configured to detect thermal radiation in either the mid-wave or long-wave infrared region of the electromagnetic spectrum.

5. The system of claim 1, wherein the wide field-of-view thermal imager is configured to acquire video at a frame rate high enough to avoid blurring due to aerial platform motion.

6. The system of claim 1, wherein computer associates stationary ground positions with a topographically flat map of only latitude and longitude coordinates, or to a visual image of the search area covered.

7. The system of claim 1, wherein the computer is a component of either of the WFOV or narrow field-of-view thermal imagers.

8. The system of claim 1, wherein the computer is a subcomponent or card within a computer component of either of the wide field-of-view or narrow field-of-view thermal imagers.

9. The system of claim 1, wherein the user is a human being or automatic target recognition software.

10. The system of claim 1, wherein the narrow field-of-view thermal imager can automatically detect, further magnify, and track the most intense thermal anomaly in the narrow sector it has been directed to image, thereby increasing the visual impact of that object to the user without requiring user intervention.

11. The system of claim 1, wherein the orientation of the centerline of the wide field-of-view thermal imager relative to the vertical is 45° or less in order to minimize spatial resolution non-uniformity or curvature of the wide field-of-view thermal imager's visual field due to perspective or optical aberration.

12. The system of claim 1, wherein a background image is subtracted from each video frame collected by the wide field-of-view thermal imager to correct for non-uniformity in the focal plane array sensitivity, fixed pattern noise, or environmental effects influencing the output from the wide field-of-view thermal imager.

13. The system of claim 1, wherein the wide field-of-view thermal imager has a field of view of 45° or greater for directing ahead of or directly below the aerial platform to the search area.

14. A method for searching for a thermal target, comprising:
directing a wide field-of-view thermal imager disposed on a moving platform toward a selected search area;
acquiring multiple images in a field of view of the wide field-of-view thermal imager as the wide field-of-view thermal imager moves relative to the search area;
correlating each point of each image to a stationary position within the search area;
averaging the amplitude of a thermal signal emanating from each sector in the search area imaged by the wide field-of-view thermal imager;
identifying one or more sectors of interest as any sector having an average signal that is at least three standard deviations above a local mean;
automatically directing a narrow field-of-view thermal imager disposed on the moving platform configured to point to the sector of interest, zoom to a field of view that is equal to or less than 10% of the field of view of the wide field-of-view thermal imager; and
displaying the sector of interest to a user.

15. The method of claim 14, wherein the moving platform is an aerial platform and the search area is the surface of a body of water.

16. The method of claim 14, wherein the moving platform is an aerial platform and the search area is the surface of a land mass.

17. The method of claim 14, wherein the moving platform is supported on land or water and the search area is in the sky or horizon.

18. The method of claim 14, wherein the moving platform stays in one location but can be rotationally re-oriented.

19. The method of claim 14, wherein the wide field-of-view thermal imager is stationary and for which the field of view does not change but the narrow field-of-view thermal imager can be re-oriented.

* * * * *

UNITED STATES PATENT AND TRADEMARK OFFICE
CERTIFICATE OF CORRECTION

PATENT NO. : 8,373,127 B2
APPLICATION NO. : 12/491720
DATED : February 12, 2013
INVENTOR(S) : Anthony J. Ragucci and John Lusher Page 1 of 1

It is certified that error appears in the above-identified patent and that said Letters Patent is hereby corrected as shown below:

In the Abstract, line 3, "corrected" should read --connected--; line 6, "acouires" should read --acquires--; line 8, "imaoe" should read --image--; line 12, "bv" should read --by--; line 12, "imager." should read --imager--; and line 15, "imaoe" should read --image--.

Signed and Sealed this
Second Day of April, 2013

Teresa Stanek Rea
*Acting Director of the United States Patent and Trademark Office*